United States Patent [19]
Fletcher et al.

[11] 3,800,074
[45] Mar. 26, 1974

[54] APPARATUS FOR SCANNING THE SURFACE OF A CYLINDRICAL BODY

[76] Inventors: James C. Fletcher, Administrator of the National Aeronautics and Space Administration with respect to an invention of; Robert B. Nakich, Glendale; Raymond C. Woodbury, La Canada, both of Calif.

[22] Filed: June 28, 1972

[21] Appl. No.: 266,911

[52] U.S. Cl.............. 178/6, 178/DIG. 1, 178/7.6
[51] Int. Cl. .................................................. H04n 7/00
[58] Field of Search.............. 178/7.6, DIG. 27, 7.1, 178/DIG. 36, DIG. 37, 6; 356/158

[56] References Cited
UNITED STATES PATENTS

| | | |
|---|---|---|
| 3,643,015 | 2/1972 | Davidovits et al. .......... 178/DIG. 37 |
| 2,465,898 | 3/1949 | Martin ................................. 178/7.6 |
| 3,049,588 | 8/1962 | Barnett .......................... 178/DIG. 1 |
| 2,842,617 | 7/1958 | Turkheimer.................... 178/69.5 F |

*Primary Examiner*—Richard Murray
*Attorney, Agent, or Firm*—Monte F. Mott; Paul F. McCaul; John R. Manning

[57] ABSTRACT

A laser scanning system for providing a two-dimensional display of a cylindrical surface, such as to display striae of a fired bullet. The cylinder is scanned along its axis by vibrating one mirror in the laser beam path, and is scanned in a direction normal to its axis by vibrating a second mirror in a direction normal to the first or by rotating the bullet. Scan control signals are adjusted in phase to produce a synchronized display of a video signal obtained from detection of scattered light from the surface thus scanned by a laser beam.

6 Claims, 3 Drawing Figures

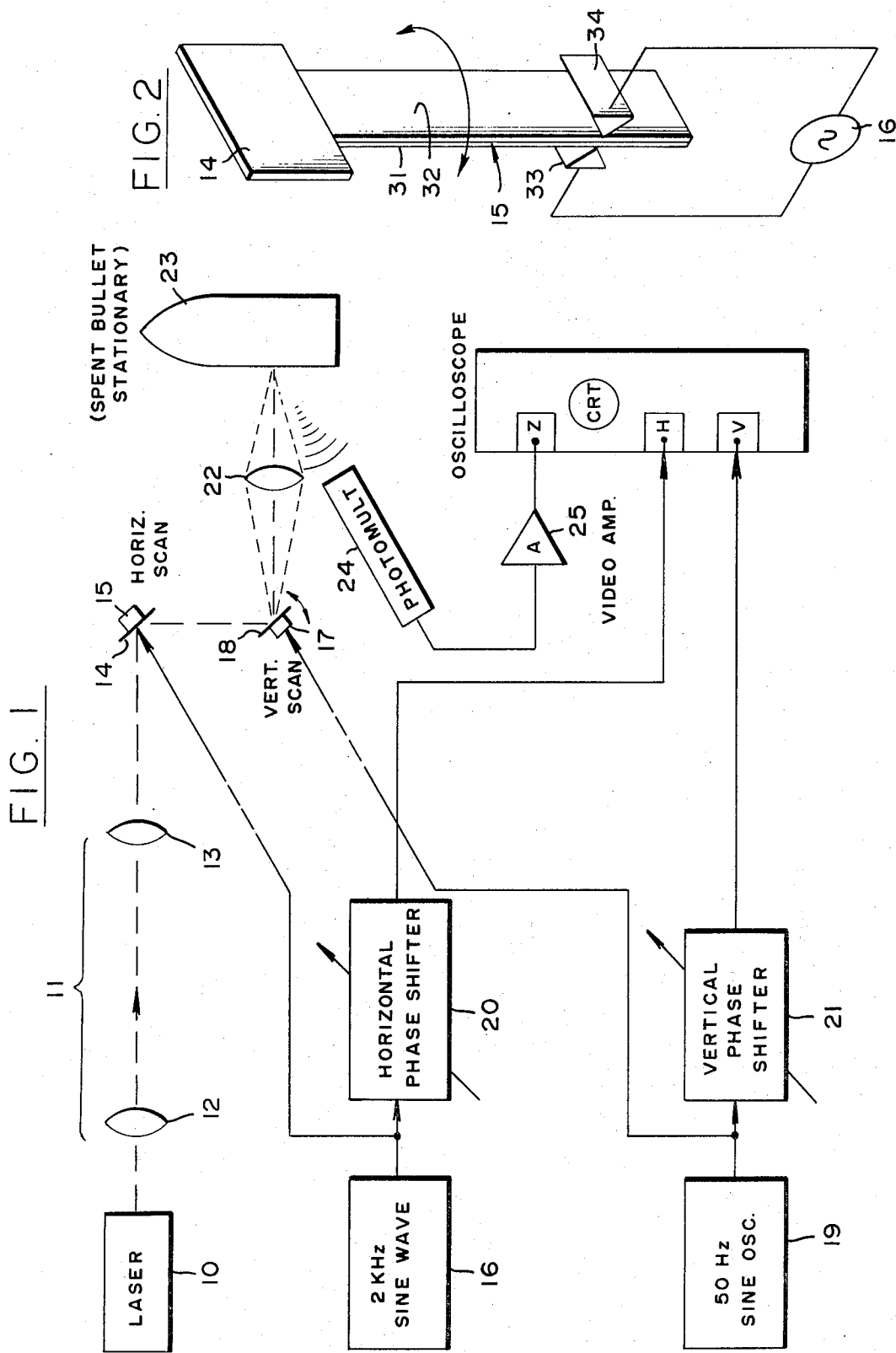

APPARATUS FOR SCANNING THE SURFACE OF A CYLINDRICAL BODY

ORIGIN OF INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

This invention relates to apparatus for scanning the surface of a cylindrical body to provide a two-dimensional display of characteristics of the surface, such as striae of a fired bullet.

One of the problem areas in the investigation of crimes is the identification of firearms, which is the process of identifying a specific weapon as having fired a particular bullet. Visual examination of the markings left on the bullet by its movement through a rifled barrel is used to identify the firearms. Determination of physical dimensions and analysis of markings, termed class and individual characteristics, are used to effect classification and identification of the bullet.

Class characteristics are those measurable features which indicate a restricted group source, such as a particular model from a particular manufacturer. Each manufacture has his own general specifications for bore dimensions, groove widths, and angle of twist, which as a class are restricted largely to that particular maker. These characteristics establish that the bullet was fired from a firearm of one particular factory and no other. Various measurements establish the class characteristics of a bullet, such as bore diameter, caliber, angle or twist, etc. These measurements are relatively easy to effect.

Individual characteristics are the peculiarities introduced when fired which characterize a particular weapon. Individual characteristics of the bore of a weapon are found in the striae along its length. The striae on a bullet therefore represent the sum total of markings produced during its travel throughout the entire length of the bore. This produces a signature which enables identification of a particular weapon.

Firearm identification is a key function of any crime laboratory. The basic analysis tool is a light microscope for comparison of a bullet with a specimen fired from a suspected firearm. The microscope equipped with mechanical means for rotating simultaneously the bullets being compared. Typically, the bullets are attached to the ends of separate arbors (by wax or some other adherent). The arbors are capable of both rotary and axial movement. The axial movement is needed to effect alignment along the longitudinal axis, and the rotary movement is needed to compare point by point the surface around the bullet. Use of this type of microscope is laborious since both bullets must be rotated and shifted frequently to line up characteristics for comparison. The depth of focus is extremely limited in this type of microscope because of the magnification required. Therefore, only the tangent surface is clearly visible; there is rapid defocussing of adjacent areas on both sides. Each examination takes from thirty minutes to two hours to complete and there is a constant backlog of specimens remaining to be examined. Because of this, only a relatively small number of examinations can be undertaken in most large crime laboratories, and even under the best of conditions only about 70 percent of the examinations result in proper determination of identification. It is therefore, evident that the present laboratory procedures are slow, manual and inexact (it has not been possible to set objective standards for identification).

SUMMARY OF THE INVENTION

An object of this invention is to provide apparatus for scanning and imaging a bullet for identification purposes.

A more general object is to provide improved apparatus for scanning and imaging a cylindrical surface.

These and other objects are achieved by means for focussing and directing a narrow beam of light onto the surface of a cylindrical object, using a laser beam deflecting means for cyclically deflecting the beam back and forth in a direction along the axis of the object in response to a first signal at a first rate, and means for producing relative cyclical motion between the surface of the object and the beam in response to a second signal at a second rate in a second direction normal to the axis of the object. Means for detecting scattered light from the surface thus scanned with a laser beam produces a video signal, and means for displaying the video signal on a cathode-ray tube. The horizontal and vertical deflection of the cathode-ray tube beam are synchronized with the laser beam deflection signals and adjusted in phase to produce an image of the surface being scanned.

BRIEF DESCRIPTION OF THE DRAWINGS

FIG. 1 illustrates a first embodiment in which a cylindrical surface to be scanned is stationary and the scanning laser beam is deflected in two orthogonal directions at different rates, one direction being along the axis of the cylindrical surface.

FIG. 2 shows an exemplary device for deflecting a laser beam.

DESCRIPTION OF THE PREFERRED EMBODIMENTS

Figure 3:
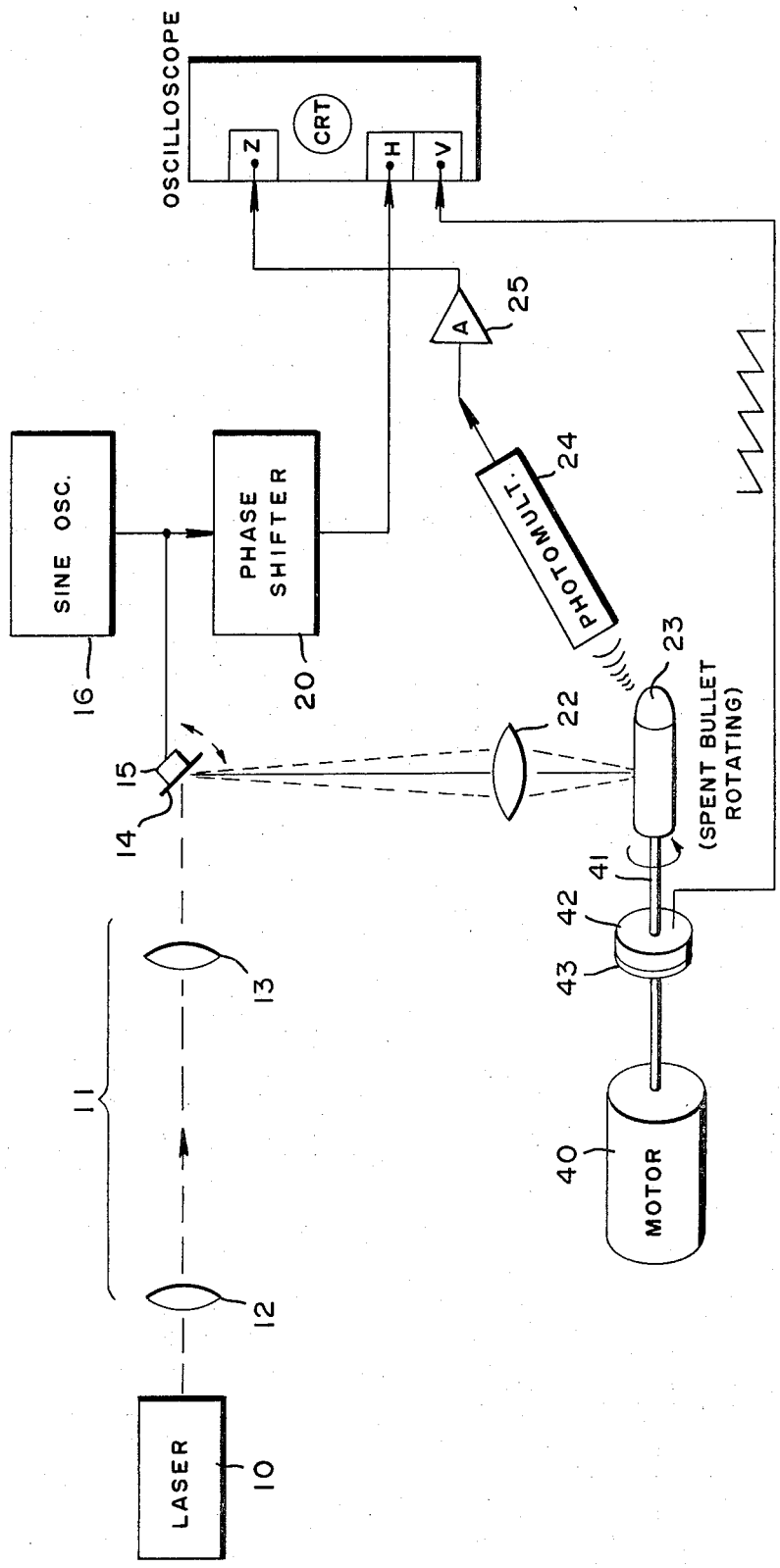
FIG. 3 illustrates a second embodiment in which the cylindrical surface is rotated and the laser beam is deflected in only one direction along the axis of the cylindrical surface.

FIG. 1 shows a block diagram for a laser raster scanning system. Laser light emitted from a standard laboratory 1-milliwatt helium-neon laser 10, is transmitted through a compound lens 11 comprised of a first convex lens 12 and a second convex lens 13. The function of the compound lens is to provide the smallest possible focused beam from the narrow laser beam. The focused beam impinges the face of a mirror 14 attached to piezoelectric rod 15. The rod is twisted by a sinewave oscillator 16 to deflect the laser beam horizontally at a 2 KHz rate. A typical construction for a piezoelectric rod for vibrating a mirror such as a rod 15 for vibrating a mirror 14, is shown in FIG. 2.

A second piezoelectric rod 17 which vibrates a mirror 18 is driven by a second oscillator 19 operating at 50 Hz for deflecting the beam vertically. The two deflections produce scanning rasters which correspond to similar display rasters produced on the face of a cathode-ray tube (CRT) of an oscilloscope. Sinusoidal deflection of the CRT electron beam is utilized because all linearity and blanking problems inherent in sawtooth deflection are eliminated. The electron beam covers the CRT screen with a progression of Lissajou figures which require no blanking intervals, synchronization pulses, or linearity compensation circuits. The only requirements is synchronization of the electron beam flying spot with the laser flying spot, which is accomplished by driving the horizontal (H) and vertical (V) deflection circuits of the CRT with the horizontal and vertical scan signals.

When the laser spot is at a particular coordinate in the light raster, the CRT spot must be at the corresponding coordinate in the display. This is accomplished by simple phase shift networks 20 and 21 because the mirror deflectors and CRT deflection circuits are driven simultaneously by the same sinewave generators. When a sector of the target is scanned, an unintelligible image is displayed on the CRT until phase synchronization is applied. By alternately adjusting horizontal and vertical phase shift networks 20 and 21, the deflection circuits are brought into synchronization, and the CRT image is clarified.

A condensing lens 22 focuses the light beam upon the surface of a bullet 23. Scattered light reflected from the bullet surface is collected by photomultiplier tube 24 which converts the light intensity variations into corresponding video signals. The video signals are amplified in a low noise, low phase distortion video amplifier 25. The video signals are inserted into the oscilloscope by connecting the output of the amplifier directly to the intensity control circuit (Z) of the oscilloscope. This produces an intensity modulation of the electron beam of the CRT. The raster display on the screen of the CRT then shows a sector of the bullet surface.

In order to realize the greatest number of resolvable spots within the light raster, it is necessary to optically reduce the laser beam diameter at the bullet surface to the smallest possible size. This is accomplished by lenses 12, 13 and 22 in FIG. 1. The result is a focused laser beam at the focal plane of condensing lens 22. The focused beam is deflected horizontally and vertically over the greatest possible angle by the vibrating mirrors 14 and 18, thus generating a raster of individual resolvable spots.

Both mirrors 14 and 18 are vibrated or twisted in the same manner. The only difference is the frequency and axis about which the mirrors are vibrated to produce a horizontal scan at a fast rate (2KHz) and a vertical scan at a much lower rate (50Hz). Accordingly, only the system for vibrating the mirror 14 will be described with reference to FIG. 2. The rod 15 is a piezoelectric (PZ) rod comprised of two face-shear PZ plates 31 and 32 cemented together so that their expanding diagonals are perpendicular. When the sinusoidal voltage from the oscillator 16 is applied across both plates at one end through contacts 33 and 34, the rod will twist. The electrical contacts 33 and 34 also serve as knife-edge supports for the one end of the rod, thus assuring that the other end twists to vibrate the mirror 14.

PZ mirror deflection systems have several advantages such as simplicity, low cost, ease of excitation and elimination of retrace blanking requirements for the CRT display device. This last is due to the fact that the electron beam of the display is driven to produce Lissajou coverage of the CRT screen and because synchronization of the laser raster with the CRT raster is effected simply by means of the phase shift networks.

There are some disadvantages such as the difficulty of realizing large deflection angles of the light beam, especially at higher scan rates, and the difficulty of realizing a large number of resolvable spots in a light raster because of the small deflection angles. Furthermore there is diminished video resolution because of the relatively small number of resolvable spots in the light raster.

To illustrate the limited order of magnitude of horizontal deflection angles realizable with piezoelectric crystals, assume a horizontal deflection of 0.8 inch is generated at condensing lens 22 at a distance of approximately 26 inches from the vibrating mirrors. The horizontal deflection angle in that case would be:
Deflection angle = 2 [Arctan (0.8/2 × 1/26)]= 1°20′

In FIG. 3, a speed controlled motor 40 rotates the bullet supporting arbor 41 through a sawtooth waveform generator 42 which includes phase shifting network 43 for adjusting phase in a manner corresponding to phase shifter 21 in the embodiment of FIG. 1. The sawtooth waveform generator 42 produces a sawtooth waveform for each motor shaft revolution. The sawtooth waveform is fed to the vertical deflection circuit of the CRT.

The video channel of this second embodiment is the same as the first embodiment. Since rotation of the bullet is synchronized with the vertical deflection system of the CRT, the changing pattern produced by the horizontal scanning system is accurately depicted on the CRT screen. A storage-type CRT is preferred to produce a display on image which depicts the entire unwrapped cylindrical surface of the bullet as the bullet revolves, the image is restored during each revolution. This image is an accurate representation of the unwrapped surface in a flat plane. The flat plane enables more rapid comparison of surface features for determining gun/bullet identification. It also makes possible development of an objecive system for individual classification of surface features.

An interesting feature of the laser scanning system is the virtual "automatic focussing" which occurs on axial displacement of the bullet with respect to condensing lens 22. A number of continuous depth contours can be seen simultaneously because scattered light is the determining factor. This feature is important in the embodiment of FIG. 3 because it minimizes the accuracy with which the horizontal scanning system must be aligned with the axis of the bullet. In the embodiment of FIG. 1, where the scanning system is both along and across the axis of the bullet, this feature permits imaging a wider sector of the bullet. Scanning with a conventional microscope in the same manner would yield a useful image only along a very narrow path over the axis of the bullet. Of course, a certain amount of video resolution is lost because individual laser spots no longer retain a minimum diameter as the target is moved away from the focal plane of condensing lens 22.

Blurring of the image does indeed occur on the CRT display, but as a whole, the bullet remains relatively in focus even when displaced a considerable distance from the focal plane. This characteristic is of particular value in the analysis of bullet surfaces since the surface is always in relatively good focus even though the bullets may have large protrusions or depressions over the contours being scanned.

A second characteristic of the laser scanned system is the slight loss of magnification which occurs when the bullet is displaced from the focal plane of lens 22. If the bullet is displaced from the optimum plane of focus, the laser light raster increases in size, and the overall area displayed on the CRT diminishes. As the bullet is brought closer to the optimum focal plane, the CRT displays an ever-larger area of the sector being scanned. This is so because the size of the light raster decreases as the bullet sector moves toward focus. Thus, when the bullet sector is moved toward optimum focus, image resolution on the CRT improves because the laser light spot is smaller near focus, and apparent magnification increases. At the exact focal plane, all resolution disappears because an image placed at this position is at the threshold of making a complete 180 degree reversal of focus orientation (that is, the image turns inside out from its previous focus orientation when moved from one side of the focal plane to the other). Therefore, the focal plane of lens 22 is not the optimum focal position for the scanning laser system. Instead, the optimum position is just in front of or just beyond the lens focal plane.

Any photographic technique for preserving the CRT image may be utilized to obtain a permanent record of the surface features of the specimen. The information concerning the bullet surface could also be video-taped directly from the electronics. In that manner, a single system may be employed to scan a bullet and then a series of specimens. Once all the specimens have been scanned, the process of comparing the bullet with the specimens may be carried out separately.

A laser scanned ballistic analysis system has several advantages. Any desired usable magnification of the cylindrical surface can be provided by simple optical and electronic adjustments. Thus, both horizontal and vertical stretching of the video presentation could be effected by adjusting the horizontal and vertical sweep sensitivities of the CRT display. This would have particular utility when comparison of a deformed bullet is to be made with a specimen which is not deformed. For example, a dual trace oscilloscope could be used for the video display of both bullet surfaces one above the other. A beam splitting technique could be utilized in a practical application to produce two separate laser beams from a single source for examining two bullet surfaces simultaneously. Phasing techniques could then be utilized to electronically orient one with respect to the other. Simultaneously, the display of either surface could be stretched in either or both the horizontal and vertical directions. The possibility of linearizing or restoring damaged or deformed surfaces of spent bullets by means of simple shaping of the video sweep voltages, or more complex computer techniques such as those used in connection with space photography, is foreseeable. This capability would provide maximum flexibility for comparing striae on the specimen surfaces.

Digital techniques could also be used to enhance the system. For example, digitally controlled motors for bullet rotation could be used and digital control of the video deflection circuits could be effected. This approach would provide precise and positive indexing of any surface sector of the specimen, storage of data for later reproduction in any of the many forms now available through digital equipment, and possibly, automation of the entire comparison process under computer control, using pattern recognition methods.

Laser radiation instead of incoherent radiation is used to scan the bullet surface for the following reasons. The intensity of a focused laser beam, in the diffraction limit, is several orders of magnitude greater than the focused beam of the highest intensity incoherent source known. The excellent directivity of the beam makes the laser superior from an alignment point of view. A laser eliminates the need for optical gratings, irises, and other devices associated with generation of "pseudo-monochromatic" light from an incoherent source.

Pseudo-monochromatic light developed by gratings results in extremely low light levels at the illuminated target. Consequently, the signal-to-noise ratio decreases to such an extent that a photomultiplier detector is incapable of generating acceptable video signals. Laser light permits use of relatively inexpensive detector devices because the signal-to-noise ratio of the video signal generated from scattered light emitted from a target surface is very large.

Background filtering designed to reduce ambient light in the vicinity of the target is more efficient with laser light because sharp bandpass filters (e.g., Kodak Wratten filters) centered at the laser wavelength can be utilized. Laser light is practically mono-chromatic. Incoherent light, on the other hand, consists of many frequencies preventing efficient use of background filters.

What is claimed is:

1. Apparatus for scanning and imaging the surface of an opaque object comprised of
    means for producing a narrow beam of light,
    means for focussing said beam on one side of said surface of said object,
    a source of a first cyclical signal at a first frequency,
    a source of a second cyclical signal at a second frequency,
    means for cyclically deflecting said focused beam back and forth in a given direction along the surface of said object in response to said first signal,
    means for producing relative cyclical motion between said surface and said beam in a direction normal to said given direction in response to said second signal,
    means for detecting light scattered from said surface of said object thus scanned with said beam to produce a video signal, said detecting means being offset from the optical axis of said focussing means,
    a cathode-ray tube having a horizontal deflection means, a vertical deflection means and an intensity control means for display of said video signal, said video signal controlling said intensity control means,
    means for adjusting the phase of one of said first and second signals, and applying the phase adjusted signal to one of said horizontal and vertical deflection means, and
    means for producing a signal for control of the other of said horizontal and vertical deflection means in response to the other of said first and second signals, whereby the horizontal and vertical deflection of said electron beam of said cathode-ray tube are adjusted in phase to produce an image of said surface being scanned.

2. Apparatus as defined in claim 1 wherein said means for producing relative cyclical motion between said surface and said beam is comprised of means for cyclically deflecting said beam back and forth, and said means for producing a signal for control of the other of said horizontal and vertical deflection means in response to the other of said first and second signals is comprised of means for adjusting the phase of the other of said first and second signals.

3. Apparatus as defined in claim 2 wherein each of said means for deflecting said beam in different directions is comprised of a mirror and means for pivotally vibrating said mirror about an axis in response to a different one of said first and second signals, said mirrors being disposed for one to receive said beam and direct it to the other, and the other being disposed to direct said beam onto said surface, the pivotal axis of vibration of said mirrors being normal to each other.

4. Apparatus as defined in claim 1 for imaging a cylindrical object wherein said surface to be scanned is a surface of revolution generated by revolving a substantially straight line about an axis and said means for producing relative cyclical motion between said surface and said beam is comprised of a motor, means for attaching said object to the shaft of said motor for rotation of said object about said axis of revolution in response to rotation of said shaft, and means for applying said other of said first and second signals to said motor.

5. Apparatus as defined in claim 4 wherein said means for producing a signal for control of the other of said horizontal and vertical deflection means in response to the other of said first and second signals is comprised of a periodic waveform generator which produces one cycle of a signal waveform for each revolution of said object, said generator being connected to said object to be driven in synchronism with said object by said motor.

6. Apparatus as defined in claim 5 wherein said means for cyclically deflecting said beam back and forth in a given direction along said axis of revolution of said surface in response to said first signal is comprised of a mirror, and means for vibrating said mirror about an axis in response to said first signal, said mirror being disposed to receive said beam and direct it onto said surface, the axis of vibration of said mirror being normal to said axis of revolution of said surface.

* * * * *